United States Patent
Achari et al.

(10) Patent No.: US 11,201,864 B2
(45) Date of Patent: Dec. 14, 2021

(54) VENDOR AGNOSTIC CAPTIVE PORTAL AUTHENTICATION

(71) Applicant: HEWLETT PACKARD ENTERPRISE DEVELOPMENT LP, Houston, TX (US)

(72) Inventors: Rajesh Kumar Ganapathy Achari, Mumbai (IN); Anoop Kumaran Nair, Mumbai (IN); Venkatesh Ramachandran, Bangalore (IN); Pattabhi Attaluri, Santa Clara, CA (US); Bhagya Prasad Nittur, Santa Clara, CA (US); Antoni Milton, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 244 days.

(21) Appl. No.: 16/429,462

(22) Filed: Jun. 3, 2019

(65) Prior Publication Data

US 2020/0382497 A1    Dec. 3, 2020

(51) Int. Cl.
| | | |
|---|---|---|
| G06F 21/44 | (2013.01) | |
| G06F 21/45 | (2013.01) | |
| H04L 29/06 | (2006.01) | |
| G06F 21/71 | (2013.01) | |

(52) U.S. Cl.
CPC ........ H04L 63/0876 (2013.01); H04L 63/105 (2013.01)

(58) Field of Classification Search
None
See application file for complete search history.

(56) References Cited

U.S. PATENT DOCUMENTS

| | | | |
|---|---|---|---|
| 9,369,299 B2 | 6/2016 | Dupont et al. | |
| 2009/0210935 A1* | 8/2009 | Miley | H04W 12/126 726/7 |
| 2011/0302643 A1* | 12/2011 | Pichna | H04L 63/0892 726/7 |
| 2013/0111024 A1* | 5/2013 | Setia | H04L 67/02 709/225 |

(Continued)

OTHER PUBLICATIONS

CN105141537. English Translation. (Year: 2015).*

(Continued)

*Primary Examiner* — Venkat Perungavoor
(74) *Attorney, Agent, or Firm* — Nolte Lackenbach Siegel

(57) ABSTRACT

Methods and systems for providing vendor agnostic captive portal authentication in a network that includes a plurality of network access devices are provided. For instance, one method includes receiving a redirect request for a communication between a first user-terminal and a first network access device, the redirect request including at least one of a vendor-specific item of information of the first network access device and an Internet Protocol (IP) address of the first network access device. The method further includes comparing the at least one of the vendor-specific item of information of the first network access device and the IP address of the first network access device against each of a plurality of entries of a network access device database, and providing the first user-terminal access to a captive portal page in response to an appropriate match.

14 Claims, 7 Drawing Sheets

(56) References Cited

U.S. PATENT DOCUMENTS

| | | | | |
|---|---|---|---|---|
| 2013/0269011 A1* | 10/2013 | Wilson | ................... | H04L 63/08 |
| | | | | 726/6 |
| 2014/0047510 A1* | 2/2014 | Belton | ............... | H04W 12/069 |
| | | | | 726/4 |
| 2014/0366117 A1* | 12/2014 | Kumar | ................... | H04L 63/02 |
| | | | | 726/11 |
| 2015/0288578 A1* | 10/2015 | Schwengler | ........ | H04L 41/5054 |
| | | | | 705/39 |
| 2016/0269380 A1 | 9/2016 | Kishida | | |

OTHER PUBLICATIONS

Implementation of Bandwidth Management Authentication. Rahman. IJCANDI. (Year: 2016).*
CN107682372. English Translation. (Year: 2018).*
BSA Network Access Control, Mar. 13, 2009, 4 Pgs.
Hosted Service Provider Wi-fi Solutions, (Research Paper), Jul. 16, 2018, 2 Pgs.
How to Discover, Visualize, Secure, and Control Complex Enterprise Networks, (Research Paper), Nov. 26, 2012, 66 Pgs.

* cited by examiner

VENDOR AGNOSTIC CAPTIVE PORTAL AUTHENTICATION

BACKGROUND

The third layer of the Open Systems Interconnection (OSI) Model, commonly referred to as the network layer, is known as the OSI layer where data routing takes place. Many networks use a layer 3 captive portal authentication for network access as captive portal authentication does not require any direct configuration for networked devices, and captive portal authentication tends to be intuitive for the users to enter their credentials when greeted with a properly-branded portal page that has the appropriate instructions. Different network access device vendors support captive portal authentication in different ways. For example, different network access device vendors may vary the particular parameters included in an HTTP redirect request generated by a network access device, the format in which the particular parameters are provided, and the logic that a captive portal page follows in order to successfully complete a layer 3 authentication.

BRIEF DESCRIPTION OF THE DRAWINGS

Various examples of this disclosure that are proposed as examples will be described in detail with reference to the following figures, wherein like numerals reference like elements, and wherein.

DETAILED DESCRIPTION

Figure 1:
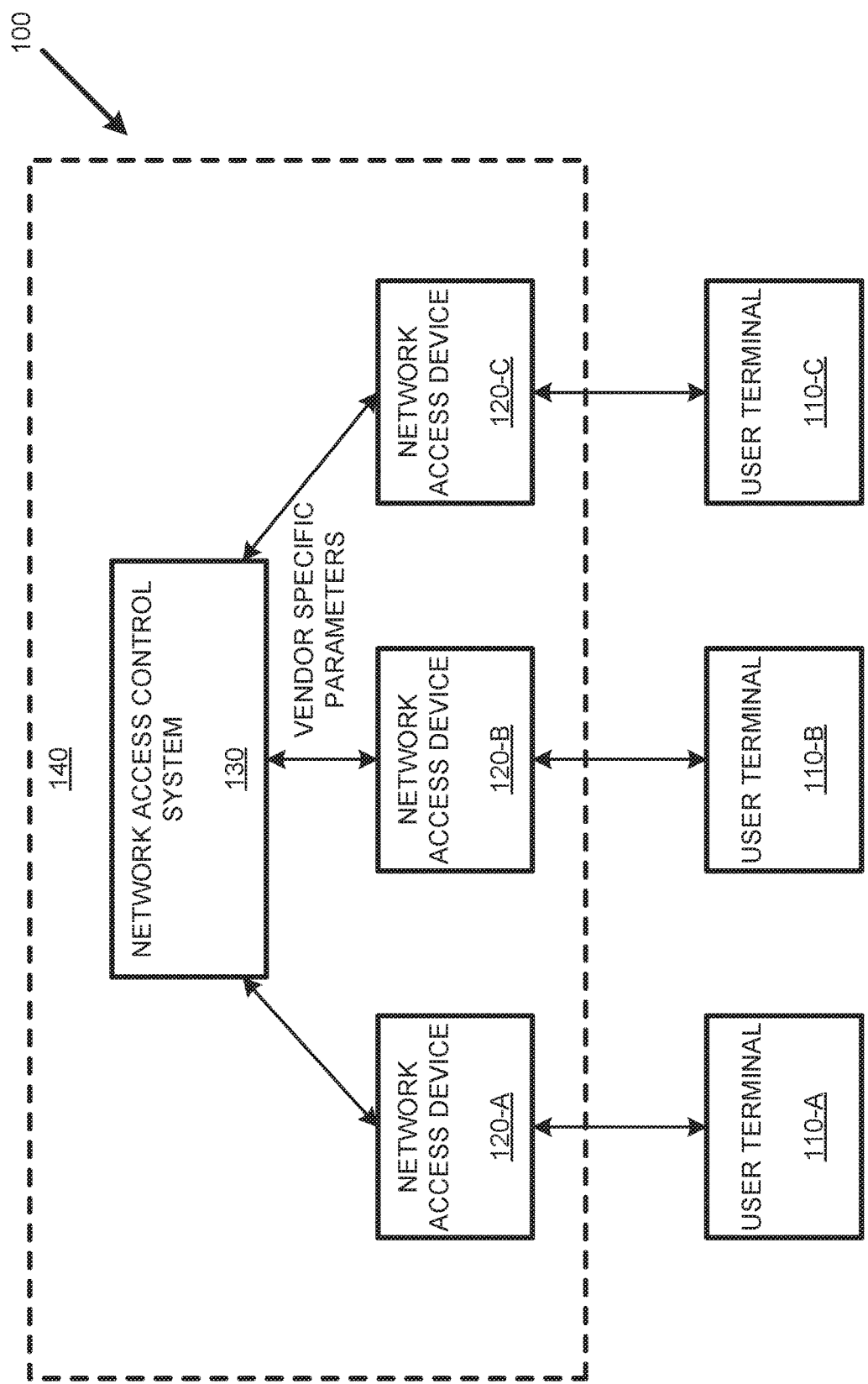
FIG. 1 depicts a communication network that uses vendor agnostic captive portal authentication, according to one or more examples of the disclosure.

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

For the purposes of this disclosure, a "network" is a medium to which various communication devices can be communicatively coupled with one another with each device having a unique address that permits the various devices to transfer messages to and from one another.

Also for the purposes of this disclosure, a "network protocol" is a set of rules and conventions for communication between network devices. Support for network protocols can be built into software, hardware, or both. To successfully send and receive information within a network, various devices in a communication exchange must accept and follow protocol conventions. Network protocols can provide authentication (verifying user credentials before granting access to networks) and authorization (verifying one or more user access policies on how much and what kinds of resources are allowed for an authenticated user) for users that connect and use a network service.

The Open Systems Interconnection (OSI) model is a conceptual model that characterizes and standardizes communication functions of a telecommunication or networked computing system without regard to its underlying internal structure and technology. The purpose of the OSI model is to provide interoperability of diverse communication systems/networks using standard protocols. The OSI model partitions a communication/networked system into seven functional layers. Each OSI layer serves the layer above it and is served by the layer below it.

The second layer of the OSI model is referred to as the "data link layer." The data link layer provides data transfer between different networked devices. The data link layer defines protocols to establish and terminate connections between two communicatively coupled devices, and defines flow control protocols.

The third layer of the OSI model is referred to as the "network layer." The network layer provides the functional and procedural means of transferring data from one device to another device within a network and between networks.

The term "Network Access Control" (NAC) refers to some form of computer-based system, such as a server, that enforces network protocols according to one of more network policy considerations. It is to be appreciated, however, that a network access control system does not need to be a single dedicated device, and in a variety of examples a network access control system can be incorporated into one or more devices that perform other services or functions.

The term "Network Access Device" (NAD) is any electronic circuit/device capable of communicatively coupling a user terminal to a particular network. More specifically, a network access device is any device that, when incorporated into a particular network of some sort, provides communication access between the particular network and one or more user terminals. Examples of network access devices include, but are not limited to, network switches, Virtual Private Network (VPN) concentrators, network bridges, and wireless access points.

The term "user terminal" refers to any communication device that enables an end-user to communicate with a network or otherwise access at least one service provided by a network. Non-limiting examples of user terminals include any number of computers (e.g., laptop computers), smart phones, tablet computers, and Personal Digital Assistants (PDAs).

A "captive portal" is a web page accessible via a web browser that is displayed to newly connected users of a communication system/network before the newly-connected users are granted broader access to network resources. Captive portals are commonly used to present a landing or log-in page which may require authentication, payment, acceptance of an end-user license agreement, and an acceptable use policy or other valid credentials that both a network host and user agree to adhere by.

In practice, different network access device vendors support captive portal authentication in different ways. For example, different network access device vendors may vary the particular attributes included in an HTTP redirect request generated by a network access device, the format in which particular parameters are provided, parameter names, and the logic that a captive portal page follows in order to successfully complete layer 3 authentication. Unfortunately, these vendor-specific variations make it difficult to deploy captive portal authentication in a multi-vendor network with heterogeneous network access devices.

To address this difficulty, the disclosed methods and systems provide a number of unique features for networked systems that can support vendor agnostic captive portal definitions that automatically cater to the different requirements prescribed by different network access device vendor. For example, the disclosed methods and systems bypass the practice of addressing individual vendor-specific authentication portals by creating a universal captive authentication portal that, by virtue of recognizing information in a redirect request, identifies a network access device's vendor. This recognition, in turn, allows a network access control device to provide a generic portal authentication page for users while attending to the vendor-specific details used to configure network access devices according to their vendor-specific protocols.

Turning to FIG. 1, a communication system 100 is depicted that includes a number of user terminals {110-A . . . 110-C} communicatively coupled to a network 140. As can be seen in FIG. 1, the network 140 includes a number of network access devices {120-A . . . 120-C} communicatively coupled to the user terminals {110-A . . . 110-C} and communicatively coupled to a network access control system 130.

In operation, a user using one of the end terminals {110-A . . . 110-C} engages the network 140 via one of the network access devices {120-A . . . 120-C} at layer 2 in order to gain access to the network 140. The appropriate network access device {120-A . . . 120-C}, in turn, redirects the communication with the user to the network access control system 130 using a "redirect request." During this redirection operation, the appropriate network access device {120-A . . . 120-C} provides a number of parameters to the network access control system 130 including for example, the Internet Protocol (IP) address of the network access device {120-A . . . 120-C}, the Medium Access Control (MAC) address of the end terminals {110-A . . . 110-C} used by the user, and number of other parameters associated with the redirect request. It is to be appreciated that the information provided by the network access devices {120-A . . . 120-C} to the network access control system 130 may have vendor-specific formatting and vendor-specific parameters with vendor-specific names. It is to be further appreciated that the IP address and/or any vendor-specific information, labeling, and/or formatting may be used to identify the vendor of the network access device providing any given redirect request.

Figure 2:
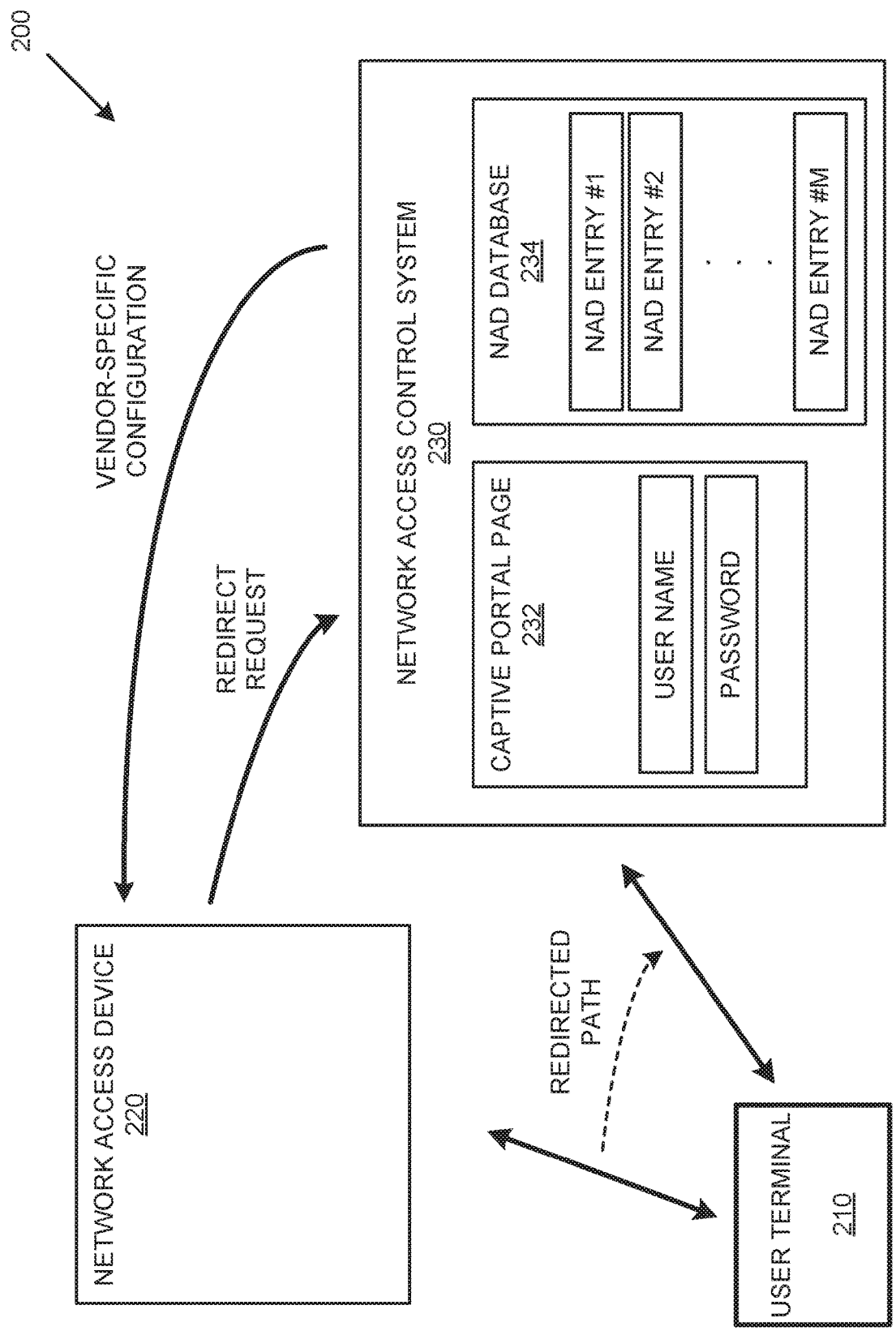
FIG. 2 depicts an overview of vendor agnostic captive portal authentication, according to one or more examples of the disclosure.

FIG. 2 depicts an overview 200 of a redirect operation for vendor agnostic captive portal authentication, according to one or more examples of the disclosure. As shown in FIG. 2, any one of a variety of network access devices 220 can redirect a communication with a user terminal 210 to a network access control system 230 using a redirect request. During operation, the network access control system 230 can receive a redirect request from a network access device 220 with the redirect request including a number of device parameters, such as the IP address of the network access device 220 and any number of the vendor-specific device parameters discussed above.

Using the received vendor-specific device parameters the network access control system 230 can determine details about a network access device 220, such as the device type and vendor, by comparing the received parameters against individual network access device (NAD) entries in a NAD database 234. For instance, using a received IP address, the network access control system 230 can compare the received IP address against each of a number of previously stored addresses, which in turn can identify a network access device's vendor, device type, and so on.

As an alternative to using an IP address, the nature of the received device parameters, e.g., type, labeling, formatting, etc. may be used to identify a network access device's vendor, device type, and so on. For instance, in various examples, assuming that a particular vendor always designs its switches to send N parameters in a unique format in a redirect request, the network access control system 230 may take advantage of such unique formatting to identify the vendor of the network access device sending such a uniquely-formatted redirect request.

Assuming that the network access devices of a particular vendor are recognized by the network access control system 230, the network access control system 230 can provide the user terminal 210 access to an appropriate captive portal page 232 having no vendor-specific fields that a user might use to perform authentication.

Assuming that a user correctly fills in the appropriate fields (e.g., user name and password) in the captive portal page 232, the network access control system 230 may grant the user network access while providing any vendor-specific configuration response back to the network access device 220—the vendor-specific configuration response usable to configure the network access device 220 to grant access to a user according to its vendor-specific protocol.

This approach enables a network administrator to define a single captive portal page and a single resultant URL that can be used to achieve captive portal authentication through different network access devices made by any of the supported vendors. Each vendor can be identified via a vendor-specific item of information from the vendor-specific configuration response. The vendor-specific item used to identify different vendors of the NAD may be of the same attribute type (e.g., both a first vendor and a second vendor can be identified via their unique response formats) or different attribute type (e.g., a first vendor can be identified via a unique response format and a second vendor can be identified via a unique label or parameter in the response).

Figure 3:
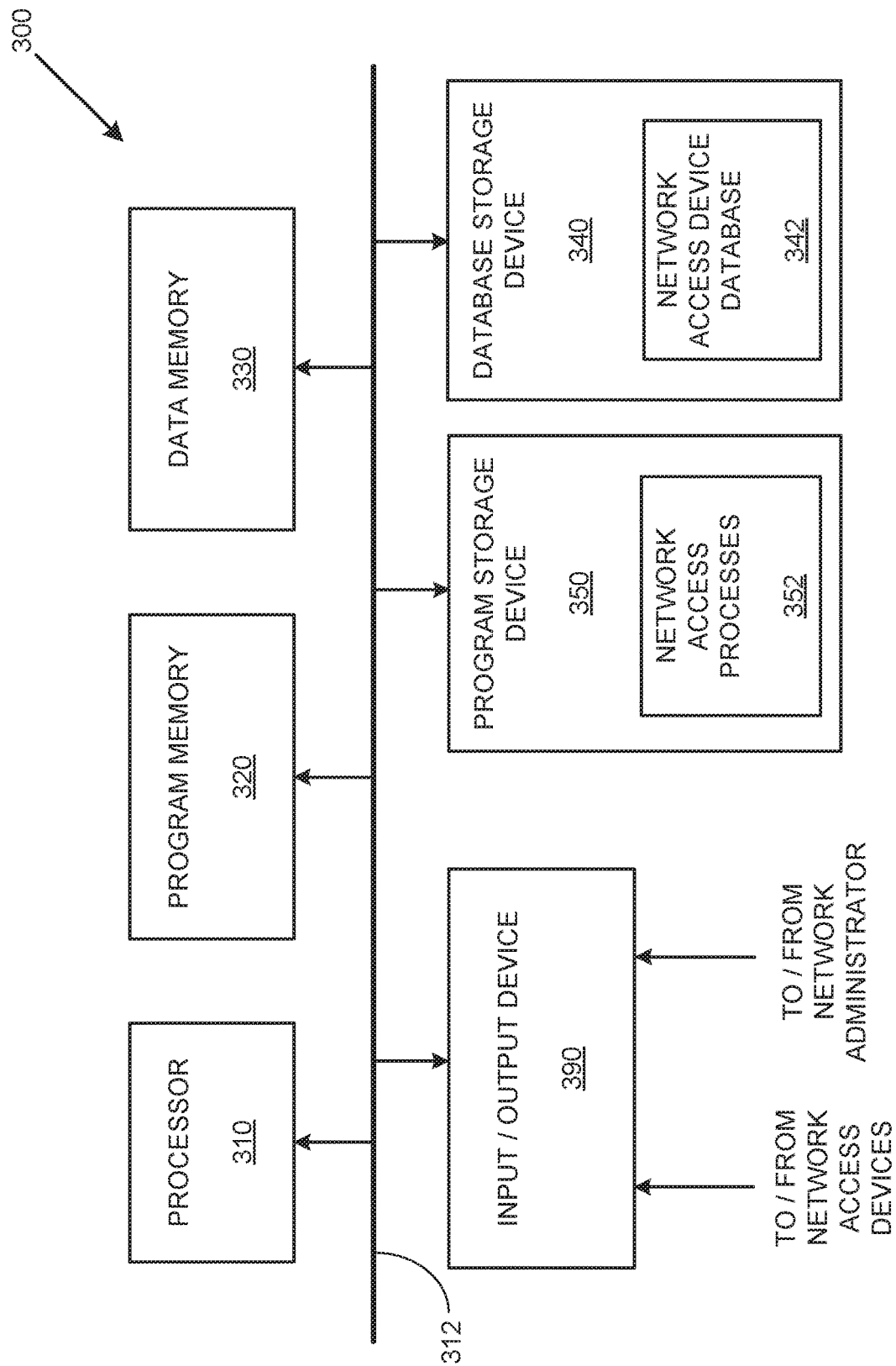
FIG. 3 is a block diagram of a network access control system that enables vendor agnostic captive portal authentication, according to one or more examples of the disclosure.

FIG. 3 is a block diagram of a network access control system 300 that enables vendor agnostic captive portal authentication, according to one or more examples of the disclosure. As shown in FIG. 3, the example network access control system 300 includes a processor 310 (e.g., a CPU), a program memory 320, a data memory 330, a database storage device 340, a program storage device 350, and an input/output device 390, The above components 310-390 are communicatively coupled together by a control/data bus 312.

Although the example network access control system 300 of FIG. 3 uses a control/data bussed architecture, it should be appreciated that any other architecture may be used as is well. For instance, in various examples, the various components 310-390 can take the form of separate electronic components coupled together via a series of separate busses.

Still further, in other examples, one or more of the various components 310-390 can take form of separate servers coupled together via one or more networks. Additionally, it should be appreciated that each of components 310-390 advantageously can be realized using multiple computing devices employed in a cooperative fashion. For example, by employing two or more separate computing devices, e.g., servers, to provide separate processing and data-handling needs, processing bottlenecks can be reduced/eliminated, and the overall computing time may be significantly reduced.

It also should be appreciated that some processing, typically implemented in software/firmware routines residing in program memory 320, alternatively may be implemented using dedicated processing logic. Still further, some processing may be performed by software/firmware processes residing in separate memories in separate servers/computers being executed by different controllers.

In operation, the example network access control system 300 can first perform a number of setup operations including transferring an operating system and a number of appropriate program(s)/process(es) from the program storage device 350 to the program memory 320. In the present example of FIG. 3, a number of network access processes 352 are used to, for example, identify the vendor of a network access device based on a redirect request, implement an appropriate vendor agnostic captive portal page, and configure the network access device according to its vendor-specific protocol to grant access to a particular user.

In addition, setup operations may include transferring an existing network access device database 342 from the database storage device 340 to the data memory 330. As is discussed above, the example network access database 342 may contain a variety of information including IP addresses and vendor-specific information pertaining to redirect requests that can enable recognition of network access device's vendor.

Subsequent operations of the example processing device 300 are discussed below with respect to FIGS. 4-7.

Figure 4:
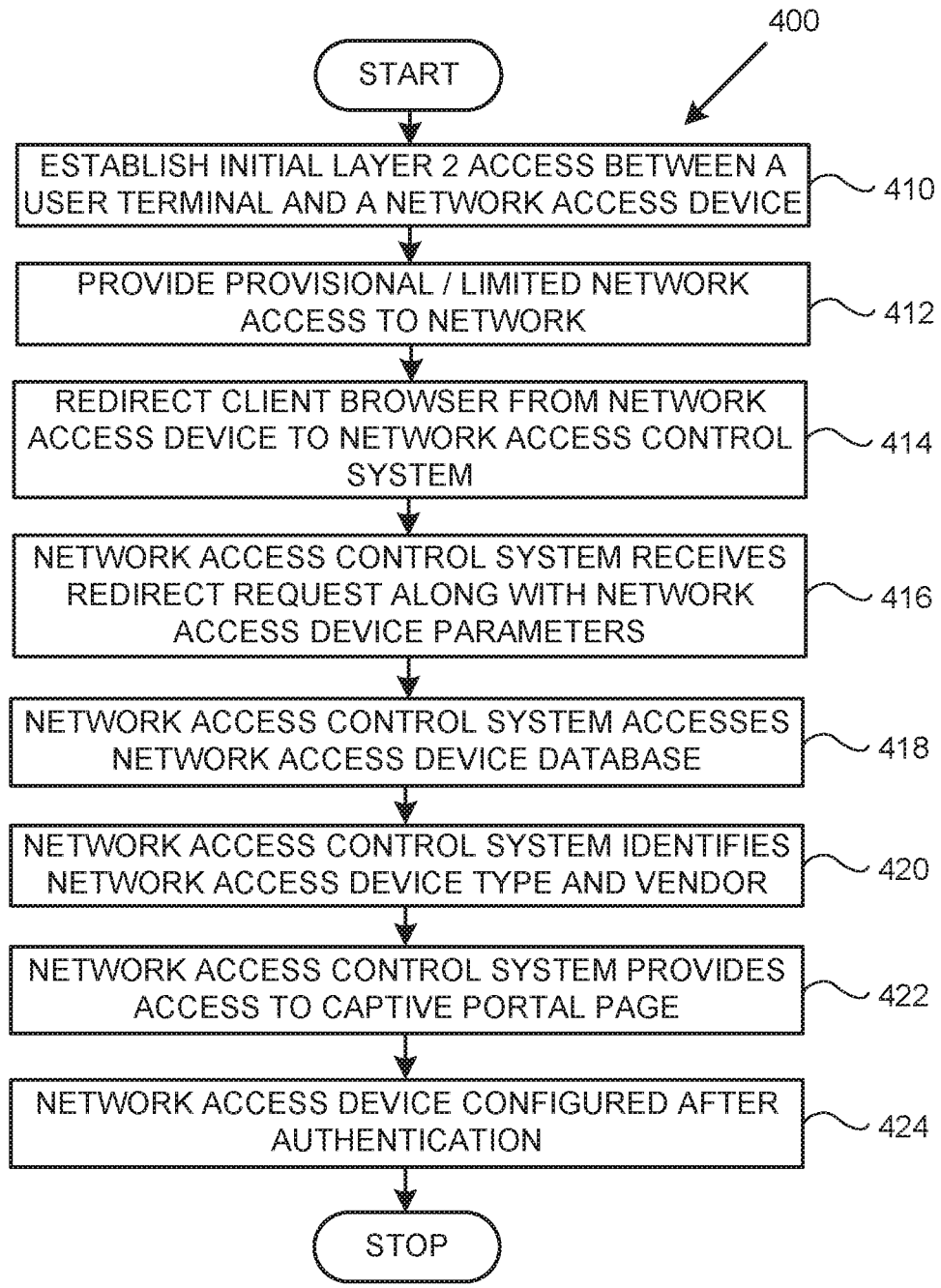
FIG. 4 is a flowchart of a method for enabling vendor agnostic captive portal authentication, according to one or more examples of the disclosure.

FIG. 4 is a flowchart of a method 400 for enabling a network administrator to implement network enforcement policies using a top-down approach. It is to be appreciated to those skilled in the art in light of this disclosure that, while the various operations of FIG. 4 are shown according to a particular order for ease of explanation, that certain operations may be performed in different orders or performed in a parallel fashion. It is to be further appreciated that certain operations may be omitted in some examples.

The method 400 starts in operation 410 where a user using a user terminal and a client browser establishes layer 2 (data link layer) access with a network access device where after in operation 412 the network access device provides provisional/limited access of the network to the user.

In operation 412, the network access device redirects communication between the user-terminal and the network access device to the first user-terminal and a network access control system, such as the network access control system 300 of FIG. 3. As discussed above, redirecting communications may be accomplished using a redirect request sent by the network access device to a network access control system. As is also discussed above, such a redirect request may include any vendor-specific items of information of the first network access device and/or an IP address of the network access device. As is further discussed above, vendor-specific items of information in the redirect request may include vendor-specific network access device parameters, vendor-specific formatting of one or more network access device parameters, and vendor-specific labels of network access device parameters. However, it is to be appreciated that any form of information that may be found in a redirect request usable to identify a vendor of a network access device is contemplated in the disclosed methods and systems.

In operation 416, the network access control system receives the redirect request with device parameters.

In operation 418, the network access control system accesses a network access device database containing information that can enable the network access control system to identify the vendor of a network access device and/or the type of network access device based upon the received parameters. In operation 420, the network access control system identifies the vendor and/or the type of network access device. As is discussed above, such an identification may be made based on the IP address of a network access device or may be identified based on the vendor-specific items of information provided by a network access device.

In operation 422, assuming that the network access device at issue is supported by the network access control system, i.e., an appropriate database entry may be found, the network access control system provides access to a vendor agnostic captive portal page. However, it is to be appreciated that, in varying examples, access to the captive portal page may be contingent upon other criteria, such as the Medium Access Control (MAC) address of a user terminal matching an access control list.

In operation 424, assuming that a user appropriately fills in the necessary information for the captive portal page, the network access control system configures the network access device to communicate with the first user-terminal according to the vendor-specific protocol of the network access device.

Figure 5:
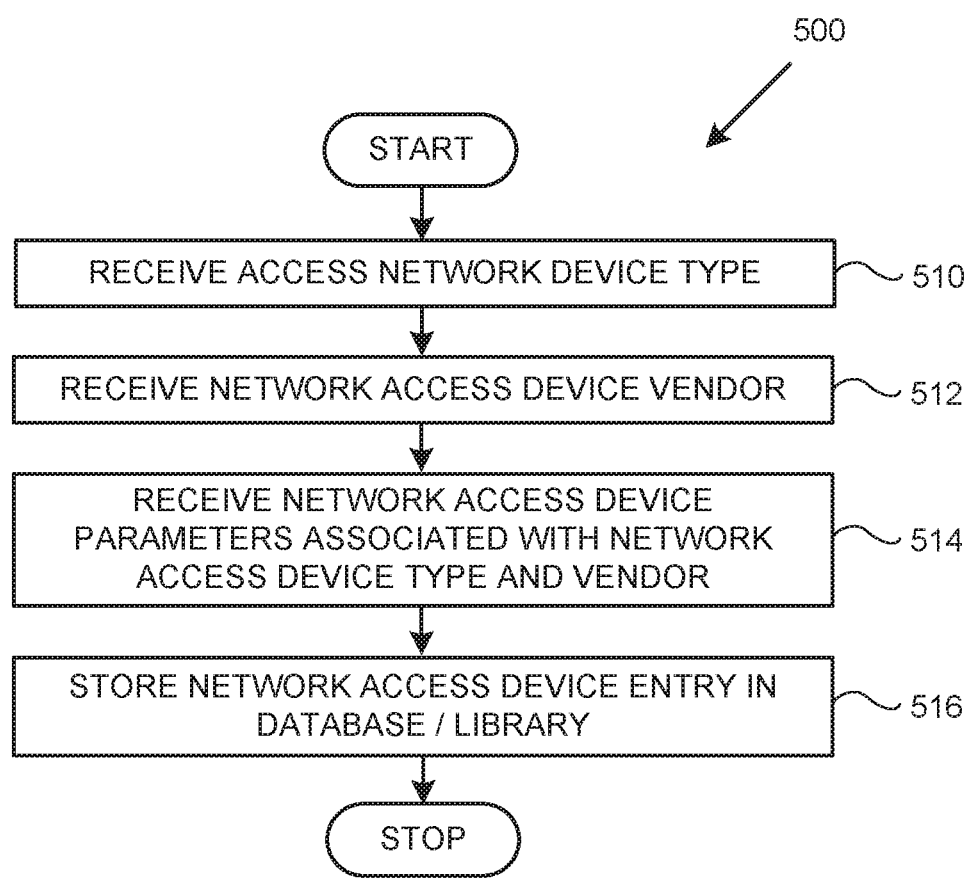
FIG. 5 is a flowchart of a method for populating a database usable for vendor agnostic captive portal authentication, according to one or more examples of the disclosure.

FIG. 5 depicts a flowchart of a method 500 for populating a database usable for vendor agnostic captive portal authentication, according to one or more examples of the disclosure. It is to be appreciated to those skilled in the art in light of this disclosure that, while the various operations of FIG. 5 are shown according to a particular order for ease of explanation, that certain operations may be performed in different orders or performed in a parallel fashion. It is to be further appreciated that certain operations may be omitted in some examples.

The method 500 starts in operation 510 where a network administrator, using a network access control system, receives information identifying a type (e.g., switch, VPN concentrator, etc.) of network access device. In operation 512, the network administrator receives information identifying the respective vendor of the network access device of operation 510.

In operation 514, the network administrator receives the various vendor-specific redirect parameters associated with the particular device of operation 510, such as the particular IP address of the network access device as well as the number, type, labeling, formatting, and other vendor-specific information relating to redirect parameters. By addressing the unique manner that network access devices of a particular vendor provide redirect parameters, a single network access device entry in a network access device database can be used to address all network access devices from a given vendor. For example, assuming that a network contains one-thousand switches from a particular vendor, a single database entry may be used to recognize the vendor of all one-thousand devices.

In operation 516, the information of operations 510-514 is stored as a unique entry in a network access device database such that a network access control device may later identify a network access device vendor based on a redirect request.

Figure 6:
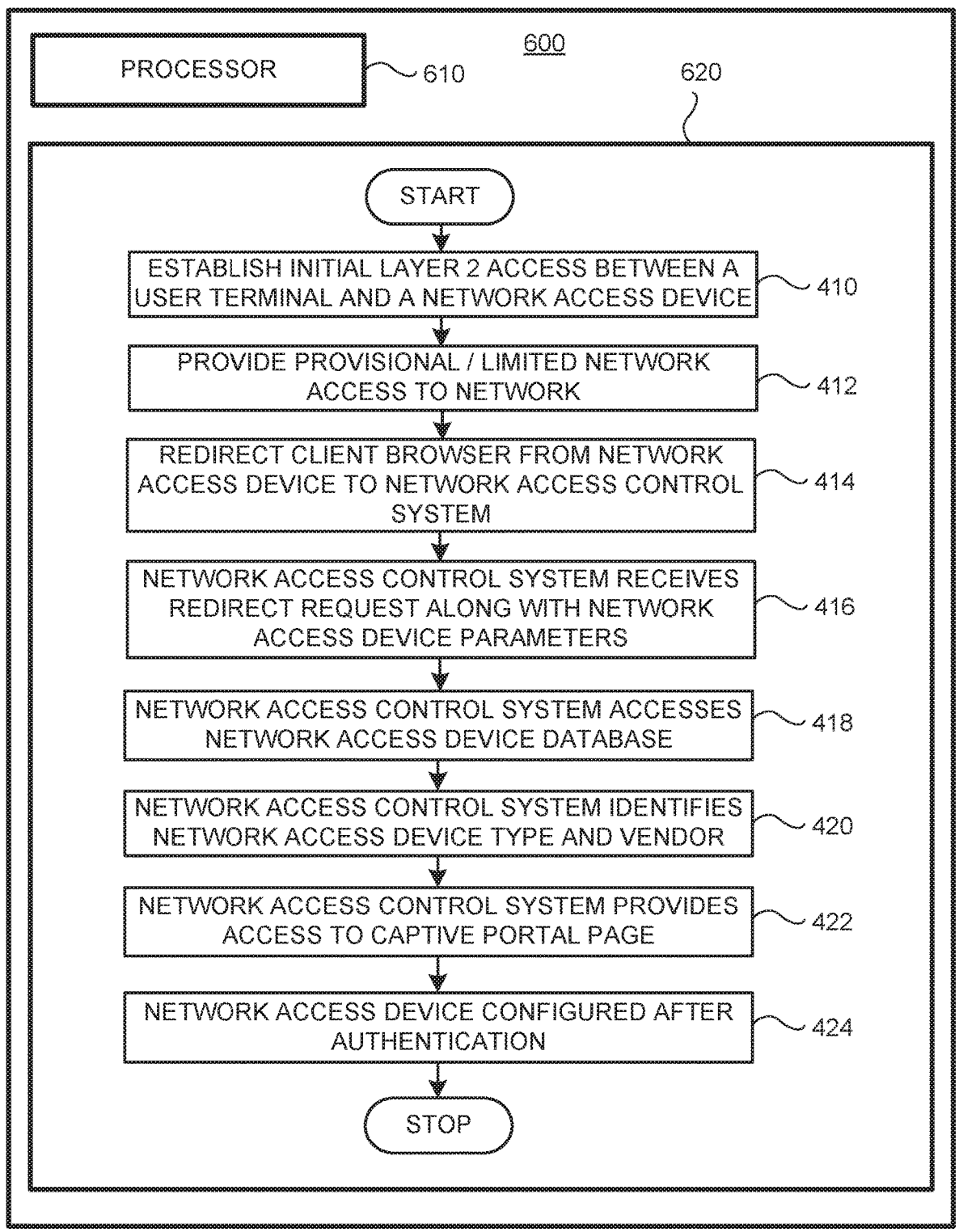
FIG. 6 depicts a computing device including a processor communicatively connected to a storage device containing instructions for enabling vendor agnostic captive portal authentication, according to one or more examples of the disclosure.

FIG. 6 depicts a computing device 600 including a processor 610 communicatively connected to a storage device 620 containing instructions {410-424} for enabling vendor agnostic captive portal authentication, according to one or more examples of the disclosure. The computer program product/storage device 620 is a non-transient computer-readable storage memory containing a plurality of instructions {410-424} such that, when operated upon by a processing system 600 that includes the processor 610 and a memory communicatively coupled to the processor 610 (e.g., one or both of the memories 320-330 of FIG. 3), causes the processor 610 to perform a number of operations consistent with the flowchart of FIG. 4. Because the operations of FIG. 4 have already been described in detail, such operations need not be repeated for the sake of brevity.

Figure 7:
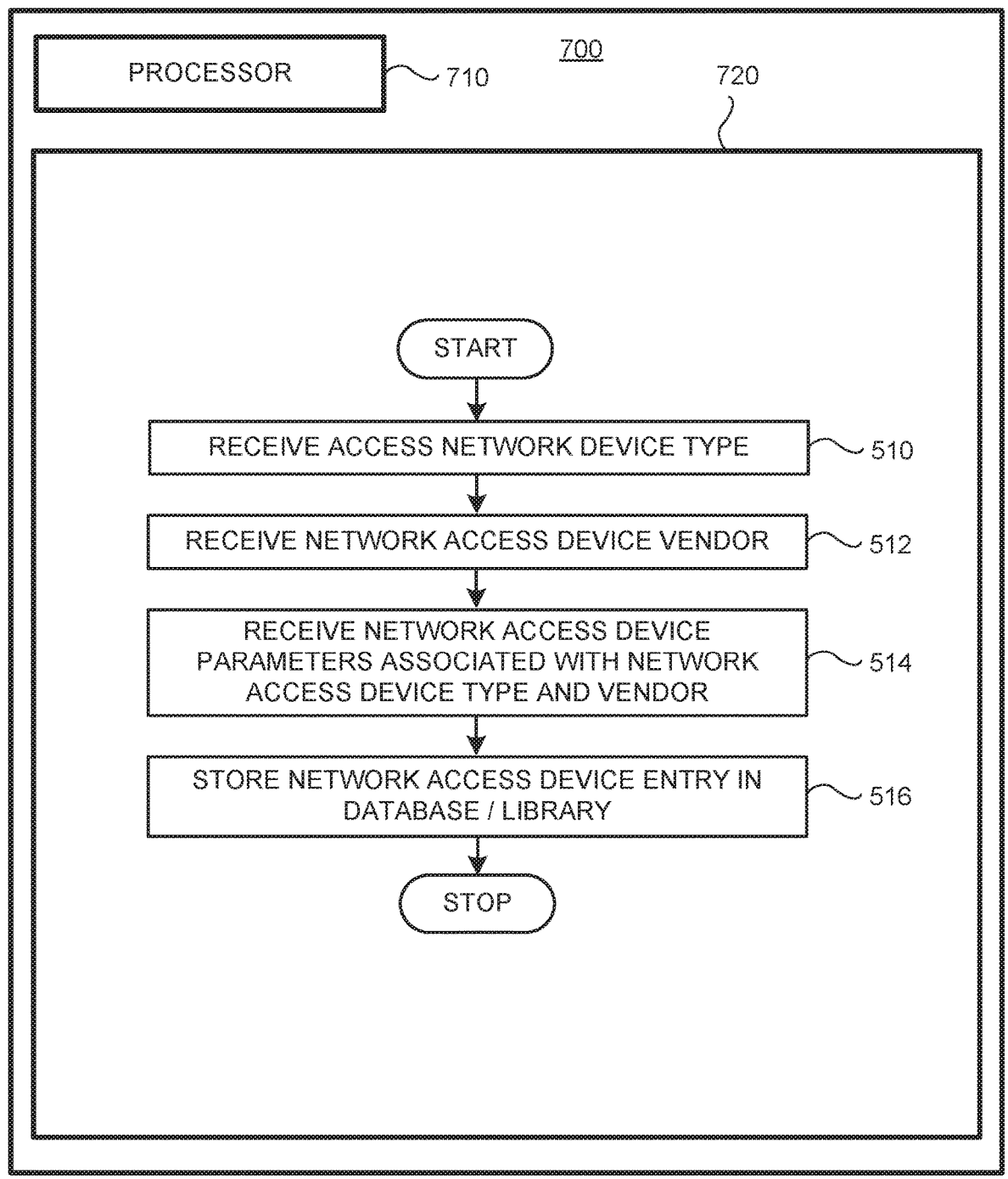
FIG. 7 depicts a computing device including a processor communicatively connected to a storage device containing instructions for populating a database usable for vendor agnostic captive portal authentication, according to one or more examples of the disclosure.

FIG. 7 depicts a computing device 700 including a processor 710 communicatively connected to a storage device 720 containing instructions {510-516} for populating a database usable for vendor agnostic captive portal authentication, according to one or more examples of the disclosure. As with FIG. 6, the computer program product/storage device 720 of FIG. 7 is a non-transient computer-readable storage memory containing a plurality of instructions {510-516} such that, when operated upon by a processing system that includes the processor 710 and a memory communicatively coupled to the processor 710 (e.g., one or both of the memories 320-330 of FIG. 3), causes the processor 710 to perform a number of operations consistent with the flowchart of FIG. 5. Because the operations of FIG. 5 have already been described in detail, such operations need not be repeated for the sake of brevity.

In various examples the above-described systems and/or methods may be implemented using any form of known or later-developed circuitry (e.g., electronic, optical) or programmable device, such as a computer-based system or programmable logic. It should be appreciated that the above-described systems and methods can be implemented using any of various known or later developed programming/scripting languages, such as "Peri," "Object Pascal," "Pascal" "SQL," "C," "C++," "FORTRAN," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes, Once an appropriate device has access to the information and programs contained on the storage media computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method for providing vendor agnostic captive portal authentication in a network that includes a plurality of network access devices, the method comprising:
   receiving a redirect request of a communication between a first user-terminal and a first network access device of the plurality of network access devices, the redirect request including a vendor-specific item of information of the first network access device and an Internet Protocol (IP) address of the first network access device, wherein the vendor-specific item of information comprises at least one of a vendor-specific network access device parameter, a vendor-specific formatting of a network access device parameter, or a vendor-specific label of a network access device parameter;
   comparing the vendor-specific item of information of the first network access device and the IP address of the first network access device against each of a plurality of entries of a network access device database; and
   providing the first user-terminal access to a vendor agnostic captive portal page in response to a match between the vendor-specific item of information of the first network access device and the IP address of the first network access device and an entry of the network access device database.

2. The method of claim 1, further comprising
   enabling a vendor of the first network access device to be identified based on the vendor-specific item of information.

3. The method of claim 2, wherein:
   the redirected communication includes the vendor-specific item of information of the first network access device; and
   access to the captive portal page is provided based on a match between the vendor-specific item of information of the first network access device against each of the plurality of entries of a network access device database.

4. The method of claim 1, further comprising
   enabling a vendor of the first network access device to be identified based on the IP address of the first network access device.

5. The method of claim 1, wherein the redirected communication further includes a Medium Access Control (MAC) address of the first user terminal; and
   access to the captive portal page is further based on the MAC address.

6. The method of claim 1, further comprising:
   establishing initial level 2 access between the first user terminal and the first network access device; and
   redirecting the communication between the first user-terminal and a first network access device in response to establishing the initial level 2 access between the first user terminal and the first network access device.

7. The method of claim 1, further comprising:
configuring the first network access device to communicate with the first user-terminal in response to a user operating the first user-terminal successfully completing the captive portal page.

8. A system for providing vendor agnostic captive portal authentication in a network that includes a plurality of network access devices, the system comprising a processor and a non-transitory computer-readable storage memory communicatively coupled to the processor, the memory containing instructions that cause the processor to:
receive a redirect request for a communication between a first user-terminal and a first network access device of the plurality of network access devices, the redirect request including a vendor-specific item of information of the first network access device and an Internet Protocol (IP) address of the first network access device, wherein the vendor-specific item of information comprises at least one of a vendor-specific network access device parameter, a vendor-specific formatting of a network access device parameter, or a vendor-specific label of a network access device parameter;
compare the the vendor-specific item of information of the first network access device and the IP address of the first network access device against each of a plurality of entries of a network access device database; and
provide the first user-terminal access to a captive portal page in response to a match between the vendor-specific item of information of the first network access device and the IP address of the first network access device and an entry of the network access device database.

9. The system of claim 8, wherein:
the network access device database enables a vendor of the first network access device to be identified based on the vendor-specific item of information;
the redirect request includes the vendor-specific item of information of the first network access device; and
access to the captive portal page is provided based on a match between the vendor-specific item of information of the first network access device against each of the plurality of entries of a network access device database.

10. The system of claim 8, wherein the network access device database enables a vendor of the first network access device to be identified based on the IP address of the first network access device.

11. The system of claim 8, wherein:
the redirected communication further includes a Medium Access Control (MAC) address of the first user terminal; and
access to the captive portal page is further based on the MAC address.

12. The system of claim 8, wherein the memory containing instructions that further causes the processor to configure the first network access device to communicate with the first user-terminal in response to a user operating the first user-terminal successfully completing the captive portal page.

13. A non-transitory computer-readable storage memory containing a plurality of instructions such that, when operated upon by a processing system, causes the processor to:
receive a redirect request for a communication between a first user-terminal and a first network access device of a plurality of network access devices, the redirect request including a vendor-specific item of information of the first network access device and an Internet Protocol (IP) address of the first network access device, wherein the vendor-specific item of information comprises at least one of a vendor-specific network access device parameter, a vendor-specific formatting of a network access device parameter, or a vendor-specific label of a network access device parameter;
compare the vendor-specific item of information of the first network access device and the IP address of the first network access device against each of a plurality of entries of a network access device database;
provide the first user-terminal access to a captive portal page in response to a match between the vendor-specific item of information of the first network access device and the IP address of the first network access device and an entry of the network access device database;
authenticate a user operating the first user-terminal so as to allow access to a network that includes a plurality of network access devices; and
configuring the first network access device to communicate with the first user-terminal using a vendor-specific protocol.

14. The memory of claim 13, wherein the memory containing instructions that further causes the processor to configure the first network access device to communicate with the first user-terminal in response to a user operating the first user-terminal successfully completing the captive portal page.

* * * * *